US011200708B1

(12) United States Patent
Badhani et al.

(10) Patent No.: US 11,200,708 B1
(45) Date of Patent: Dec. 14, 2021

(54) REAL-TIME COLOR VECTOR PREVIEW GENERATION

(71) Applicant: Adobe Inc., San Jose, CA (US)

(72) Inventors: Hemant Badhani, Nodia (IN); Abhishek Verma, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/992,677

(22) Filed: Aug. 13, 2020

(51) Int. Cl.
*G06T 11/00* (2006.01)
*G06T 7/90* (2017.01)
*G09G 5/02* (2006.01)
*G09G 5/06* (2006.01)

(52) U.S. Cl.
CPC ............ *G06T 11/001* (2013.01); *G06T 7/90* (2017.01); *G06T 2200/24* (2013.01); *G06T 2207/10016* (2013.01); *G06T 2207/20032* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,961,736 | B1* | 11/2005 | Amirghodsi | G06K 9/4652 |
| 8,699,826 | B2* | 4/2014 | Remedios | G06F 16/5838 |
| | | | | 382/305 |
| 10,109,092 | B1* | 10/2018 | Hitchings, Jr. | G06T 11/60 |
| 2005/0140996 | A1* | 6/2005 | Horiuchi | H04N 1/56 |
| | | | | 358/1.9 |
| 2011/0128562 | A1* | 6/2011 | Anazawa | G06F 3/04847 |
| | | | | 358/1.9 |
| 2013/0329990 | A1* | 12/2013 | Daisy | G06T 7/50 |
| | | | | 382/165 |

OTHER PUBLICATIONS

"Image Trace—Adobe Illustrator", Retrieved at: https://helpx.adobe.com/illustrator/using/image-trace.html—on Mar. 12, 2020, 11 pages.
"Vector Magic", Retrieved at: https://vectormagic.com/desktop—on Mar. 12, 2020, 5 pages.

* cited by examiner

*Primary Examiner* — Wesner Sajous
(74) *Attorney, Agent, or Firm* — FIG. 1 Patents

(57) ABSTRACT

Generating color vector previews for images is described. A color vector preview system processes image data using parallel pipelines: one for determining a color palette based on an image frame's depicted content and another for recoloring image frames using the color palette. The color vector preview system replaces each pixel of an image frame with a color determined from a surrounding spatial neighborhood of pixels. Input specifying a number of colors is received, and the specified number of colors are selected from replaced pixel values to define the color palette. After determining the color palette, the color palette pipeline obtains a most-recently captured image frame and updates the color palette accordingly. Simultaneously, the recoloring pipeline compares each of the replaced pixel values to the color palette and replaces each pixel based on the comparison. Recolored frames are then output as color vector previews for the image data in real-time.

20 Claims, 8 Drawing Sheets
(4 of 8 Drawing Sheet(s) Filed in Color)

REAL-TIME COLOR VECTOR PREVIEW GENERATION

BACKGROUND

With advances in computing technology, using computing devices to generate visual graphics is an increasingly preferred medium for graphic designers over conventional mediums such as pen and paper, paint and canvas, and the like. Visual graphics leveraged by graphic designers include a range of different types of digital content, such as vector graphics, raster graphics, three dimensional graphics, and so forth. During the graphic design process, vector graphics are frequently used due to their ability to scale to different resolutions without aliasing that would otherwise result from a similar scaling of raster graphics. However, it remains a challenge to convert raster graphics to vector graphics. In particular, conversion of a raster graphic to a vector graphic is a computationally intensive process that requires significant processing power and time to complete, often taking conventional approaches two to three minutes to generate a vector representation of a raster graphic.

Further, conventional vector graphic engines produce low quality representations of raster graphics, such that a resulting vector graphic requires further manual processing inputs to improve its visual quality until it provides an adequate visual representation of the raster graphic from which it was generated. Example manual processing inputs include selecting a different amount of colors for inclusion in the vector representation, which in turn requires a new round of processing by conventional vector graphic engines to generate a new vector graphic including the different amount of colors.

During the time required by conventional vector graphic engines to generate vector representations of raster graphics, graphic designers are unaware as to whether initial engine settings or subsequent manual processing inputs will result in a vector representation of acceptable quality. Consequently, conventional vector graphic generation systems require a graphic designer user to iteratively attempt different vector generation settings to identify a combination that achieves a vector representation having a desired visual appearance. Accordingly, conventional techniques for generating vector representations of raster graphics are slow, require manual tedious inputs, and consequently involve the inefficient use of computational resources.

SUMMARY

Real-time generation of a preview depicting an appearance of a color vector representation for a raster image is described. To enable generation of a preview of a color vector representation of image data in real-time (e.g., at a playback rate of a video where color vector previews are generated for each frame of the video), a color vector preview system processes image frames using two parallel pipelines: one pipeline for determining a color palette for use in recoloring image frames and another pipeline for recoloring the image frames using the color palette and outputting the recolored frames as color vector previews.

To determine the color palette for use in recoloring image frames, the color vector preview system receives an image frame and performs edge-aware color smoothing on the frame by replacing each pixel of the image frame with a color value that is determined based on color values of pixels within a spatial neighborhood surrounding the pixel. Color-smoothed pixel values are then filtered to remove noise that might otherwise result in micro-vectors within a color vector representation of the image frame, such as a color vector representation generated from the color vector preview for the image frame. A number of colors to be included in a color palette for recoloring the image data is then determined, e.g., from input to a user interface of the color vector preview system. The specified number of colors are selected from the filtered pixel values, while ensuring maximum separation between color space values of the selected colors, and used to initialize a clustering algorithm. The output of the clustering algorithm is used to define the color palette, which is used to recolor image frames of image data as they are captured by, or received at, a computing device implementing the color vector preview system.

Each image frame is recolored by comparing the image frame's pixel values to colors of the color palette and replacing each pixel with a closest one of the color palette's colors. Recolored frames are then output as color vector previews, which each color vector preview is a raster instance depicting a resulting appearance of a color vector representation of the image frame. The recoloring pipeline is configured to process each image frame as it is received by the color vector preview system, thereby enabling generation of color vector previews for each frame of image data at video playback rates. While the recoloring pipeline performs its operations, the color palette determination pipeline is configured to continuously update the color palette by processing a new image frame of the received image data as soon as it finishes generating a color palette from a previous image frame. In this manner, the color vector preview system ensures that the color palette used by the recoloring pipeline accurately reflects colors of a physical environment captured by the image data, as image data depicting the physical environment is being captured.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures.

DETAILED DESCRIPTION

Overview

Figure 1:
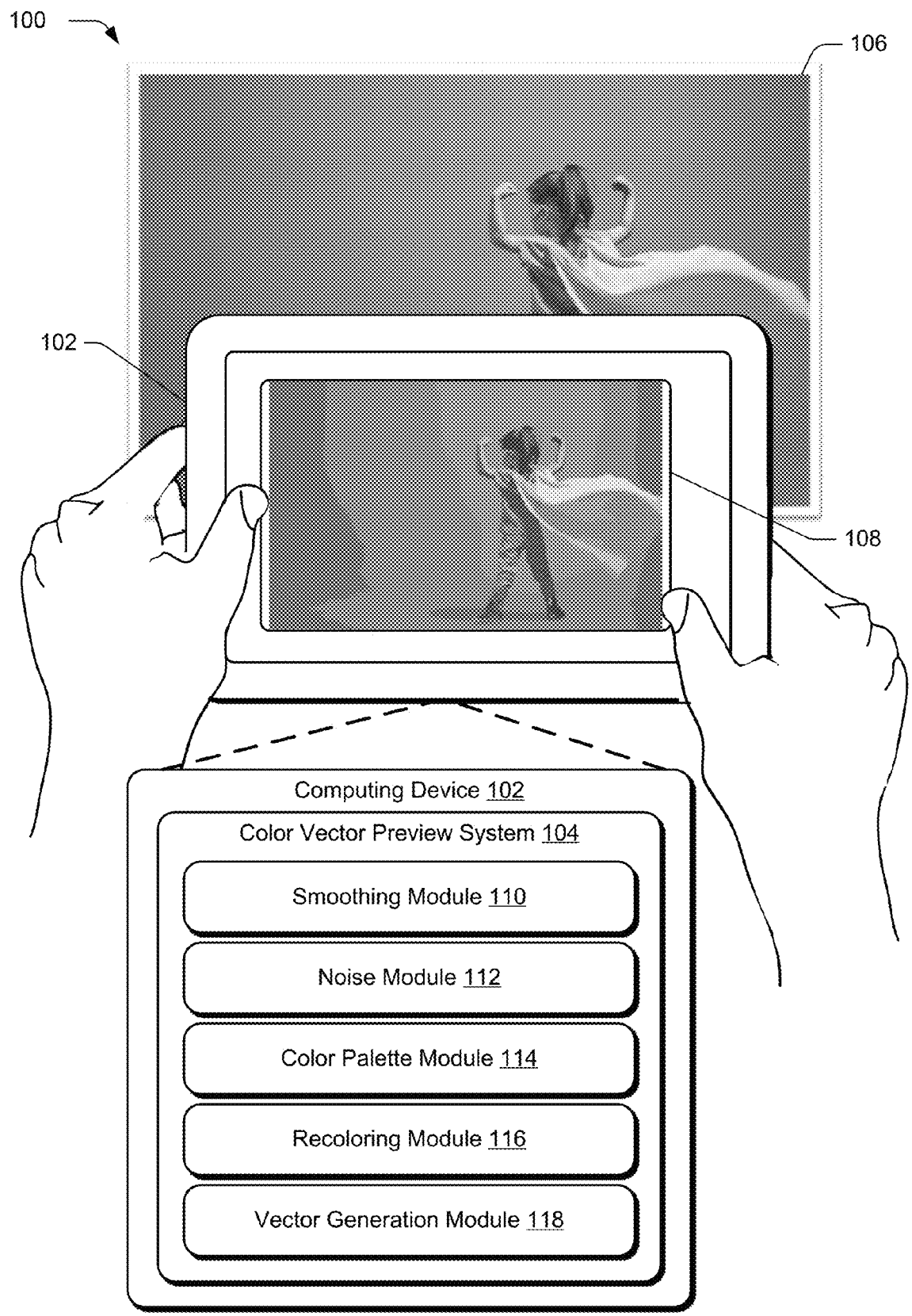
FIG. 1 is an illustration of an environment in an example implementation that is operable to employ the real-time color vector preview generation techniques described herein.

As a result of advances in computing technology, computing device are an increasingly preferred mechanism for creating visual graphics. In contrast to conventional graphic design approaches that rely on an artist's manual dexterity and skill to transfer real-world inspiration to a physical medium (e.g., pen and paper, ink and canvas, and so forth), modern computing devices provide tools that enable graphic designers to transfer real-world inspiration into the digital world, such as by capturing digital images of a physical environment using integrated digital cameras. While such raster images are frequently used in various types of digital content, artists often prefer to instead convert digital images to vector graphics given the advantageous ability to scale vector graphics to any resolution without aliasing, which is not enabled by raster graphics. Conventional approaches to generating vector graphics from raster graphics, however, are time-intensive workflows that require significant amounts of computational resources.

One significant shortcoming of conventional approaches is the requirement for a designer to first clean up an image background (e.g., by segmenting a foreground subject of an image from a remainder of the image) and remove other content depicted in the image that is not to be included in the resulting vector representation. This obligation to remove image content is due to the subsequent vectorization of the image being a time-intensive step, often requiring three to four minutes for conventional vectorization systems to complete. Furthermore, during this time-intensive vectorization step, a user of conventional vectorization systems is unaware as to whether parameters for the vectorization will result in an acceptable vector representation of the raster image.

For instance, a visual quality of a vector representation correlates with a number of colors included in the vector representation. While using additional colors to generate the vector representation preserves details depicted in the raster image from which the vector representation is generated, using too many different colors results in the generation of unintended micro-vectors to represent non-uniform colored regions of the raster image. Such micro-vectors drastically increase a file size of the vector representation and hinder a designer's ability to edit or further process the vector representation. In contrast, using too few colors to generate the vector representation results in a loss of detail otherwise depicted by the raster image. Accordingly, conventional vectorization systems are unable to provide users with a live preview of how different color counts will alter a visual appearance of a vector representation, forcing users to attempt different vectorization iterations to obtain a desired result, with significant processing time required to complete each iteration.

Various factors in addition to a number of colors to be included in the vector representation further influence the resulting appearance of the vector representation, such as lighting of an environment in which the image was captured, settings for an image capture device (e.g., camera) used to capture the image, a background against which a focal subject of the image is disposed, and so forth. Conventional vectorization systems, however, provide no mechanism for a user to determine how the different color counts and these additional factors affect the resulting vector representation. This forces users to wait until the conventional system has finished generating the vector representation and subsequently tinker with settings and/or recapture a new image to generate a vector representation of acceptable quality for the user's intended use. Even if an experienced user initially specifies an ideal number of colors to be included in a vector representation of an image and captures the image in an ideal scenario (e.g., with ideal background characteristics, environmental lighting, camera settings, and so forth), conventional systems force the user to wait until generation of the vector representation is completed, which disrupts the user's workflow and results in a degraded user experience.

Accordingly, generation of a color vector preview for image data is described. In one example, a color vector preview system receives image data (e.g., video frames) from an image capture device of a computing device upon which the color vector preview system is implemented. The color vector preview system employs two parallel pipelines to enable real-time generation and output of the color vector previews (e.g., at a video playback rate as the video frames are captured). One pipeline includes a smoothing module, a noise removal module, and a recoloring module, while the other pipeline includes a color palette module. The smoothing module, noise removal module, and color palette module are implemented by the color vector preview system to collectively determine a color palette for use in recoloring frames of the image data. The recoloring module is implemented by the color vector preview system to recolor frames of the image data and output the recolored frames as color vector previews for the image data.

Specifically, upon receiving image data that includes at least one image frame, the color vector preview communicates the image frames to the smoothing module and causes the smoothing module to generate color-smoothed pixel values for each image frame. The color-smoothed pixel values are determined for each pixel of the image frame by analyzing values of pixels within a spatial neighborhood relative to the pixel under consideration, where pixel values of the spatial neighborhood are assigned mathematical weights based on both spatial and color distances between the pixel in the spatial neighborhood and the pixel under consideration.

The color-smoothed pixel values are then used to replace the original pixel values of the image frame, thereby simplifying the image frame in terms of color details. The smoothing module is configured to perform multiple color-smoothing iterations until a desired level of color smoothing is achieved. Smoothed pixel values are then further filtered by the noise removal module to remove noise from the relatively uniform color distribution in sub-regions of the image frame to improve boundary definition between different sub-regions and mitigate an amount of unintended micro-vectors that would otherwise result from poor boundary definitions in a color vector representation of the image frame. Filtered pixels are then passed to the color palette module, which determines an optimal combination of no more than a specified number of colors to be included in the color vector representation. In some implementations, the specified number of colors is received via input to a user interface of the color vector preview system. Alternatively or additionally, the specified number of colors are determined automatically (e.g., without user intervention) by the color vector preview system.

Given the specified number of colors, the color palette module selects a corresponding number of colors from the filtered pixel values while ensuring a maximum possible color space distance between the selected colors. The selected colors are then used to initialize a clustering algorithm and the color palette module runs multiple passes of the clustering algorithm to determine final color clusters, the centers of which are selected and output as a color palette for the color vector preview of the image frame.

The color palette is communicated to the recoloring module, which compares individual pixel values of the filtered pixel values as output by the noise removal module to color values of the color palette and generates a recolored frame by replacing each pixel of the image frame with one of the colors included in the color palette. The recolored frame is then output by the recoloring module as a color vector preview for an image frame of the received image data, where the color vector preview comprises a raster image depicting a preview of a resulting vectorization of the image frame generated using the color palette. The recoloring module is configured to process each image frame of the received image data, thereby enabling generation of color vector previews for image data at video playback rates (e.g., generating color vector previews for each frame of a video as the video is captured). While the recoloring module performs recoloring of filtered pixel values as generated by the collective operations of the smoothing module and the noise removal module, the color palette module is configured to continuously update the color palette used by the recoloring module. To do so, the color palette module processes a new frame of the received image data, as represented by corresponding filtered pixel values generated by the noise removal module, as soon as the color palette module finishes generating a color palette using filtered pixel values representing a previous frame.

By performing the color palette determination operations in a parallel pipeline to the recoloring pipeline, the color vector preview system accounts for processing time required by the clustering algorithm to determine a color palette, and does not process every frame of image data to determine a corresponding color palette. Rather, the color palette is updated at a rate that depends on a processing time required by the clustering algorithm to perform its operations, such that filtered pixel values representing a new frame are communicated to the color palette module only when a previous color palette determination is complete. In contrast, the smoothing module, noise removal module, and recoloring module perform their parallel pipeline operations on every frame included in image data, with the recoloring module leveraging the most recent color palette output by the other pipeline to perform its functionality.

In this manner, the color vector preview system ensures that the color palette used by the recoloring module accurately reflects colors of a physical environment captured by the image data, as image data depicting the physical environment is being captured, while accommodating video playback rates. The color vector preview is output at a display of the device capturing the image data, together with a control that is selectable to change a number of colors included in the color vector preview. Color vector previews achieving a desired visual appearance are subsequently communicated to a vector generation system, together with the color palette used to generate the color vector previews, for use in generating an actual color vector representation of the image frames for which the color vector previews are generated. Thus, the color vector preview system enables real-time vector previews for live video, even on mobile devices supporting limited hardware resources, without the time delays and computational inefficiencies of conventional vectorization systems. As such, the techniques described herein advantageously provide users with immediate feedback as to how a certain number of colors and environmental conditions will appear when rendered as a vector graphic.

Example Environment

FIG. 1 is an illustration of a digital medium environment 100 in an example implementation that is operable to employ the real-time color vector graphic generation techniques described herein. The illustrated environment 100 includes a computing device 102 implemented according to one or more of a variety of different configurations. The computing device 102, for instance, is configured as a desktop computer, a laptop computer, a mobile device (e.g., assuming a handheld configuration such as a tablet or mobile phone), and so forth. Thus, the computing device 102 is representative of a range of different configurations, from a full resource device with substantial memory and processor resources (e.g., personal computers, game consoles) to a low-resource device with limited memory and/or processing resources (e.g., mobile devices). Additionally, although a single computing device 102 is shown, the computing device 102 is representative of a plurality of different devices, such as multiple servers to perform operations "over the cloud" as described in further detail below with respect to FIG. 8.

The computing device 102 is illustrated as including a color vector preview system 104. The color vector preview system 104 represents functionality of the computing device 102 to capture an image of a physical environment 106 in which the computing device 102 is disposed and generate a color vector preview 108 of the image of the physical environment 106. The color vector preview 108 is a raster graphic depicting a visual appearance of a color vector representation of the image of the physical environment 106, as generated according to a limited color palette determined by the color vector preview system 104. The color vector preview system 104 is configured to generate the color vector preview 108 in real-time (e.g., while the image of the physical environment 106 is being captured), such that a user of the computing device 102 is immediately informed as to how a resulting vector representation of a captured image or video will appear.

As described herein, a vector representation of an image refers to a collection of points on a Cartesian plane, connected by lines and/or curves to form shapes (e.g., polygons). The lines and/or curves connecting various points of the vector representation are referred to as vector paths, which do not restrict display of the vector paths to any particular resolution, such as a particular size of an available display area of the computing device 102. A visual appearance of each vector path included in a vector representation is defined by one or more properties, such as color, shape, curve, thickness, fill, and so forth.

In some implementations, the color vector preview system 104 includes a control that is selectable via user input to specify a number of colors to be included in the color vector preview 108. The number of colors included in the color vector preview 108 directly correlates with a visual quality of the color vector preview 108. For instance, as an increasing amount of colors are included in the color vector preview 108, additional detail of the image of the physical environment 106 is preserved. However, inclusion of a large amount of colors in the color vector preview 108 is not without drawbacks, as including too many colors results in non-uniform color regions that introduce unintended micro-vectors, such as adjacent regions of the color vector preview 108 having marginally different colors. While differences between these marginally different colors are visually imperceptible to a viewing user, the differences result in multiple different vector paths for a region that is otherwise definable using a single vector path (e.g., a single shade of blue vector path, rather than vector paths for marginally different shades of blue).

Conversely, inclusion of too few colors in the color vector preview 108 results in a vector preview that does not adequately reflect details of the image of the physical environment 106 for which the color vector preview 108 is generated. For instance, specifying that the image of the physical environment 106 is to be represented using only two colors results in a loss of content, where shading, boundaries between different regions of the image (e.g., between the cape and the body of the girl in the physical environment 106), and similar image details are not preserved in the color vector preview 108. Consequently, a number of colors to be included in the color vector preview 108 output by the color vector preview system 104 depends on a subject, environmental conditions (e.g., lighting, shadows, etc.), and the like of the physical environment 106 for which the color vector preview 108 is generated, as well as an intended use for a color vector representation generated from the color vector preview 108.

Using the techniques described herein, the color vector preview system 104 enables a user of the computing device 102 to specify various numbers of colors to be included in the color vector preview 108 while an image of the physical environment 106 is captured (e.g., during a live camera feed of the physical environment 106, as captured by a camera of the computing device 102). Alternatively or additionally, the color vector preview system 104 enables the user to use the live preview of the color vector preview 108 to experiment with lighting, camera settings, and other aspects of the physical environment 106 that affects a resulting degree of detail depicted in the color vector preview 108.

To generate the color vector preview 108, the color vector preview system 104 employs a smoothing module 110, a noise removal module 112, a color palette module 114, and a recoloring module 116. The smoothing module 110, the noise removal module 112, the color palette module 114, and the recoloring module 116 are each implemented at least partially in hardware of the computing device 102 (e.g., through use of a processing system and computer-readable storage media), as described in further detail below with respect to FIG. 8.

The smoothing module 110 is configured to monitor image data received from a camera of the computing device 102, where the image data includes at least one image frame depicting the physical environment 106 in which the computing device 102 is disposed. Given an image frame, the smoothing module 110 is configured to determine a pixel value to be assigned to each pixel of the image frame and replace each pixel of the image frame with the determined pixel value. In some implementations, the pixel value assigned to a pixel is determined by calculating a weighted average of pixel values from a neighborhood of pixels surrounding the pixel. In calculating the weighted average of pixel values, the smoothing module 110 assigns a mathematical weight to each pixel in the neighborhood based on a spatial proximity of the pixel to the neighboring pixel, where the mathematical weight influences an amount by which the neighboring pixel's color value impacts the weighted average. In some implementations, the smoothing module 110 is configured to iteratively determine pixel values to be assigned to an image frame, such as by repeating the replacement of pixel values in the image frame until a desired level of color smoothing is achieved.

The noise removal module 112 is configured to receive the pixel values assigned to the image frame by the smoothing module 110 and remove noise included in the image frame. In some implementations, the noise removal module 112 is configured to remove noise from the pixel values output by the smoothing module 110 by applying known filters to the pixel values, such as a single pass median filter. By filtering noise from image frame pixel values, the noise removal module 112 is configured to output filtered pixel values that eliminate artifacts between different color regions and achieve improved color region boundary separation relative to the pixel values output by the smoothing module 110.

The filtered pixel values are then communicated to the color palette module 114, which is configured to determine an optimal combination of no more than k colors to be included in the color vector preview 108. Because the color palette module 114 determines the optimal combination of k colors based on the filtered pixel values output by the noise removal module 112 rather than the raw pixel values of the image frame received by the color vector preview system 104, a processing time and a computational resource cost associated with determining the optimal combination of k colors are reduced.

In some implementations, the value of k for use in determining the optimal combination of ≤k colors is specified via user input to a control presented in a user interface for the color vector preview system 104. To determine the optimal combination of ≤k colors, the color palette module 114 is configured to initially select k different colors with a maximum possible color separation between each of the k colors. After the initial color selection, the color palette module 114 runs multiple passes of a clustering algorithm to determine final color clusters. From the final color clusters, the color palette module 114 is configured to select the center of each final color cluster for use as the final color palette of no more than k colors for use in the color vector preview 108.

The color palette determined by the color palette module 114 is then provided to the recoloring module 116 for use in recoloring an image frame of an image of the physical environment 106. The recoloring module analyzes pixels of the filtered pixel values output by the noise removal module 112 and compares each pixel to the color palette. Based on the comparison, the recoloring module 116 recolors each pixel of the image frame as represented by the filtered pixel values with one of the colors from the color palette that is most similar to a pixel color value of the respective filtered pixel value. After recoloring each of the filtered pixel values representing the image frame of the physical environment 106 with a color from the color palette, the recoloring module 116 outputs a recolored frame as the color vector preview 108.

A color vector preview 108 that achieves a desired visual appearance, together with the color palette used to generate the color vector preview 108, are useable as a basis to generate a color vector representation for the image frame capturing the physical environment 106. To generate such a color vector representation, the computing device implementing the color vector preview system 104 is configured to utilize a vector generation system 118. Vector generation system 118 is representative of a known vectorization library (e.g., Adobe Inc.'s Image Trace) that processes the color vector preview 108 and the color palette used to generate the color vector preview 108 and generates salient vectors for the color vector preview 108. Because the color vector preview 108 serves as a map representing which color from the color palette determined by the color palette module 114 is to be used for each pixel, the techniques described herein significantly improve the overall processing time required by the vector generation system 118 to generate a color vector representation for an image of the physical environment 106. For instance, because the texture of the color vector preview 108 has uniform colored regions with a limited color palette, the vector generation system 118 does not have to determine its own color palette for use in generating a color vector representation and vector smoothing iterations performed by the vector generation system 118 can be kept to a minimum without reducing a visual quality of the color vector representation.

In order to maintain a real-time output of the color vector preview 108 while the computing device 102 captures images of a physical environment 106 (e.g., while the computing device captures video of the physical environment 106), the color vector preview system 104 is configured to perform the color palette determination operations performed by the color palette module 114 in parallel with the recoloring operations performed by the recoloring module 116. For instance, a time required to determine a color palette for use in generating the color vector preview 108 exceeds a time required to capture individual image frames of a video of the physical environment 106. To accommodate for this time difference, while operations of the smoothing module 110, the noise removal module 112, and the recoloring module 116 are performed on every image frame of the video, operations performed by the color palette module 114 are performed on fewer than all the image frames (e.g., at a rate dependent on a processing time required for the color palette module 114 to determine a color palette, such as once every five image frames).

Because adjacent image frames (e.g., temporally contiguous video frames) are of a similar composition (e.g., include minor visual variations), color palettes extracted from previous image frames are applied as a basis to generating color vector previews 108 of subsequently captured image frames. By applying previously extracted color palettes to subsequently captured image frames, an overall frame rate of the color vector preview system 104 is improved without sacrificing visual quality of the color vector previews 108 output by the color vector preview system 104. In this manner, the color vector preview system 104 is configured to output color vector previews 108 of a physical environment 106 as image(s) of the physical environment 106 are captured, thereby enabling users to identify in real-time how a resulting vector representation of the image(s) will appear. Because the color vector preview 108 is output by the color vector preview system 104 in real-time (e.g., as the computing device is capturing the physical environment 106), a user of the color vector preview system 104 is advantageously able to make modifications to the number of colors included in the color vector preview 108, to environmental conditions, and so forth, without the delay otherwise required by conventional vectorization systems.

Having considered an example digital medium environment, consider now a description of an example system useable to generate a color vector preview of a physical environment in accordance with one or more implementations.

Figure 2:
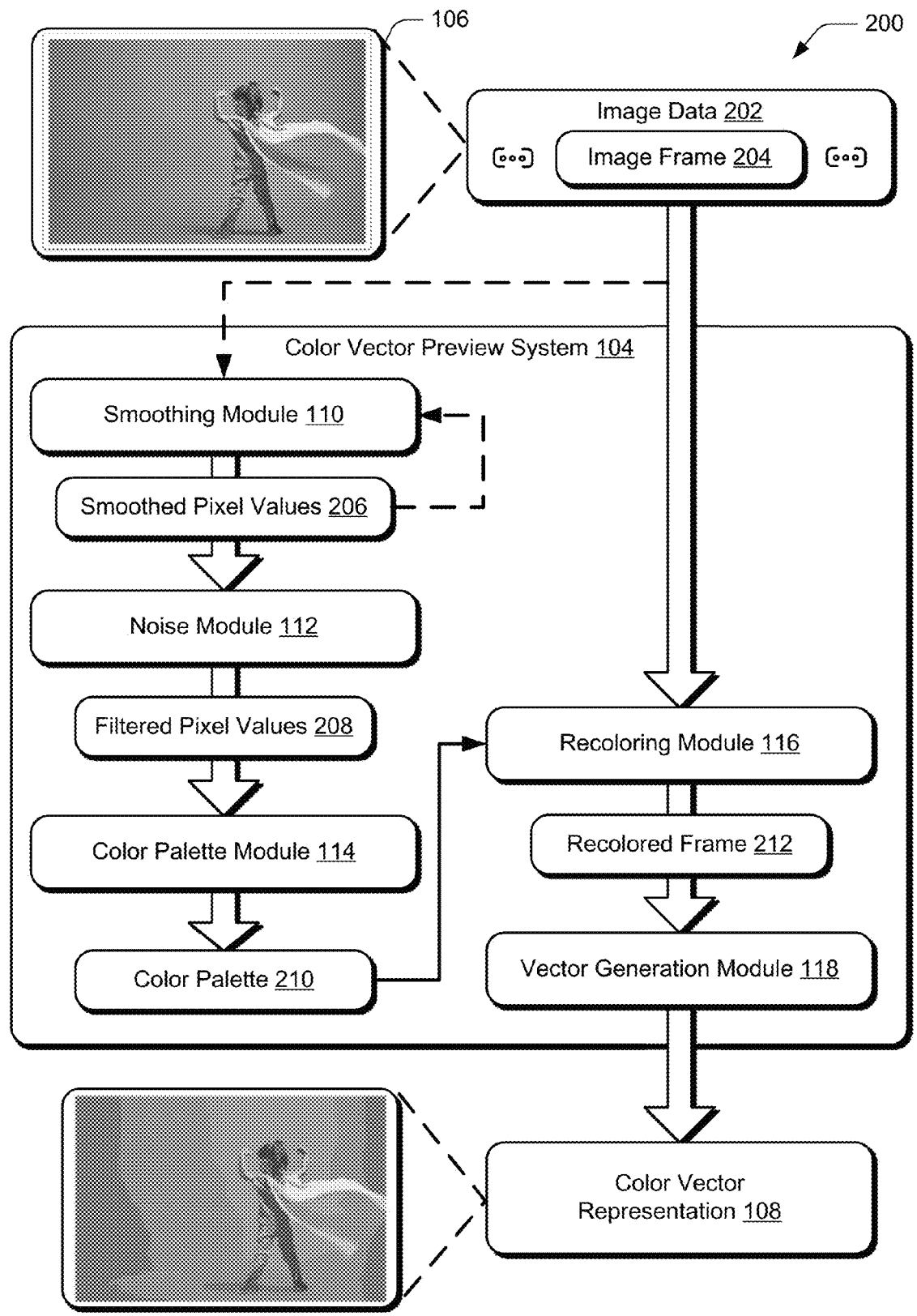
FIG. 2 illustrates an example implementation in which a color vector preview system of FIG. 1 generates a color vector preview of an image using techniques described herein.

FIG. 2 illustrates an example system 200 useable to generate a color vector preview 108 of an image, such as a photo or a video of a physical environment 106 in which a computing device implementing the color vector preview system 104 is disposed. In the illustrated example, system 200 includes the modules of the color vector preview system 104 as described with respect to FIG. 1: the smoothing module 110, the noise removal module 112, the color palette module 114, and the recoloring module 116. System 200 further includes vector generation system 118, which is representative of functionality of the computing device to generate an actual vector representation of the photo or video of the physical environment 106. System 200 is implementable on any suitable device or combination of devices. In one example, system 200 is implemented on one computing device (e.g., computing device 102 of FIG. 1). In another example, system 200 is implemented on more than one computing device, as described in further detail below with respect to FIG. 8.

The color vector preview system 104 is configured to receive image data 202, which is representative of at least one image frame 204 that depicts a physical environment in which a computing device implementing the color vector preview system 104 is disposed. In this manner, the image data 202 is representative of a single image of the physical environment 106, where the single image is captured as image frame 204 by an image capture device of a computing device implementing the color vector preview system 104. Alternatively, the image data 202 is representative of a video of the physical environment 106, where the image data 202 includes a plurality of image frames 204 that each correspond to a different video frame.

Upon receiving an image frame 204 for which a color vector preview 108 is to be generated, the color vector preview system 104 passes the image frame 204 to the smoothing module 110. The smoothing module 110 is configured to perform edge-aware color smoothing of the image frame 204 and determine smoothed pixel values 206 to be considered in place of actual pixel values of the image frame 204 for use in determining a color palette to use in generating the color vector preview 108. In order to determine the smoothed pixel values 206, the smoothing module 110 is configured to analyze the pixels of the image frame 204 and replace the color of each pixel with a weighted average of colors from nearby pixels.

To do so, the smoothing module 110 assigns a mathematical weight to neighboring pixels in a spatial neighborhood surrounding a pixel for which the replacement value is to be used. In some implementations, the weight assigned to a neighboring pixel is proportional to the neighboring pixel's spatial closeness to the pixel for which the replacement value is to be used. In addition to assigning a neighboring pixel a mathematical weight based on a spatial proximity of the neighbor pixel, the smoothing module assigns the mathematical weight based on a color similarity between the neighbor pixel and the pixel being considered (e.g., the pixel for which the replacement value is being computed).

A size of the pixel neighborhood including pixels to be mathematically weighted and used as a basis for computing the smoothed pixel value 206 for a particular pixel may include any suitable number of pixels, such as pixels within a five-pixel radius of the pixel being considered. For context, a neighborhood of pixels within a one-pixel radius of the pixel being considered would include the surrounding eight pixels, while a two-pixel radius would include the surrounding 24 pixels, a three-pixel radius would include the surrounding 48 pixels, and so forth.

Mathematically stated, the weight assigned to a neighboring pixel within the designated spatial neighborhood is described as set forth below in Equation 1, where $p$ represents the pixel for which the smoothed pixel value 206 is being computed and $p_{ij}$ represents the neighboring pixel for which the weight $w_{ij}$ is assigned.

$$w_{ij} = e^{\left(\frac{-distSq(p,p_{ij})}{2\sigma_1^2}\right)} * e^{\left(-0.2*\frac{colorDistance(p,p_{ij})}{2\sigma_1^2}\right)} \quad \text{(Eq. 1)}$$

Using the mathematical weights computed according to Equation 1, the smoothing module 110 computes a smoothed pixel value 206 for a corresponding pixel of the image frame 204 according to Equation 2, where $p_{new}$ represents a smoothed pixel value for pixel $p$. In Equation 2, although the spatial neighborhood considered in calculating $p_{new}$ is represented as a five-pixel radius, any suitable window of i by j pixels may be used in computing $p_{new}$.

$$p_{new} = \frac{\sum_{i=-5,j=-5}^{i=5,j=5}(p_{ij}*w_{ij})}{\sum_{i=-5,j=-5}^{i=5,j=5}w_{ij}} \quad \text{(Eq. 2)}$$

Using Equations 1 and 2, the smoothing module 110 is configured to determine a smoothed pixel value for each pixel included in the image frame 204, collectively represented as smoothed pixel values 206. In some implementations, the smoothing module 110 may further process the smoothed pixel values 206 using Equations 1 and 2, as represented by the dashed arrow returning smoothed pixel values 206 to the smoothing module 110. This process of generating smoothed pixel values 206 is repeated for any suitable number of iterations until a desired level of color smoothing and uniformity is achieved. In some implementations, the smoothing module 110 performs five iterations of color smoothing operations described in Equations 1 and 2 before passing the smoothed pixel values 206 to the noise removal module 112.

Upon receipt of the smoothed pixel values 206, the noise removal module 112 is configured to remove boundary artifacts and other noise that result from the edge-aware color smoothing operations performed by the smoothing module 110. To do so, the noise removal module 112 applies a filter to the smoothed pixel values 206 and generates filtered pixel values 208. The filter implemented by the noise removal module 112 is representative of any suitable known digital filtering technique, such as a single pass median filter with a kernel diameter of three. By applying a single pass median filter to the smoothed pixel values 206, the noise removal module 112 preserves edges depicted in the image frame 204 while generating sharper boundaries between different color regions of the image frame 204, resulting in cleaner regions. In this manner, the filtered pixel values 208 represent a scaled-down version of the original texture and details depicted in the image frame 204, thereby improving a performance of downstream computing operations involved in generating the color vector preview 108 by simplifying a range of color details considered by the downstream operations.

The filtered pixel vales 208 are then communicated from the noise removal module 112 to the color palette module 114 for use in identifying an optimal combination of no more than k colors to be used in representing the texture and details of the image frame 204, as represented by the filtered pixel values 208. For an illustration of how different numbers of k colors to be included in a color vector preview 108 affect a resulting visual quality of the color vector representation, consider FIG. 3.

Figure 3:
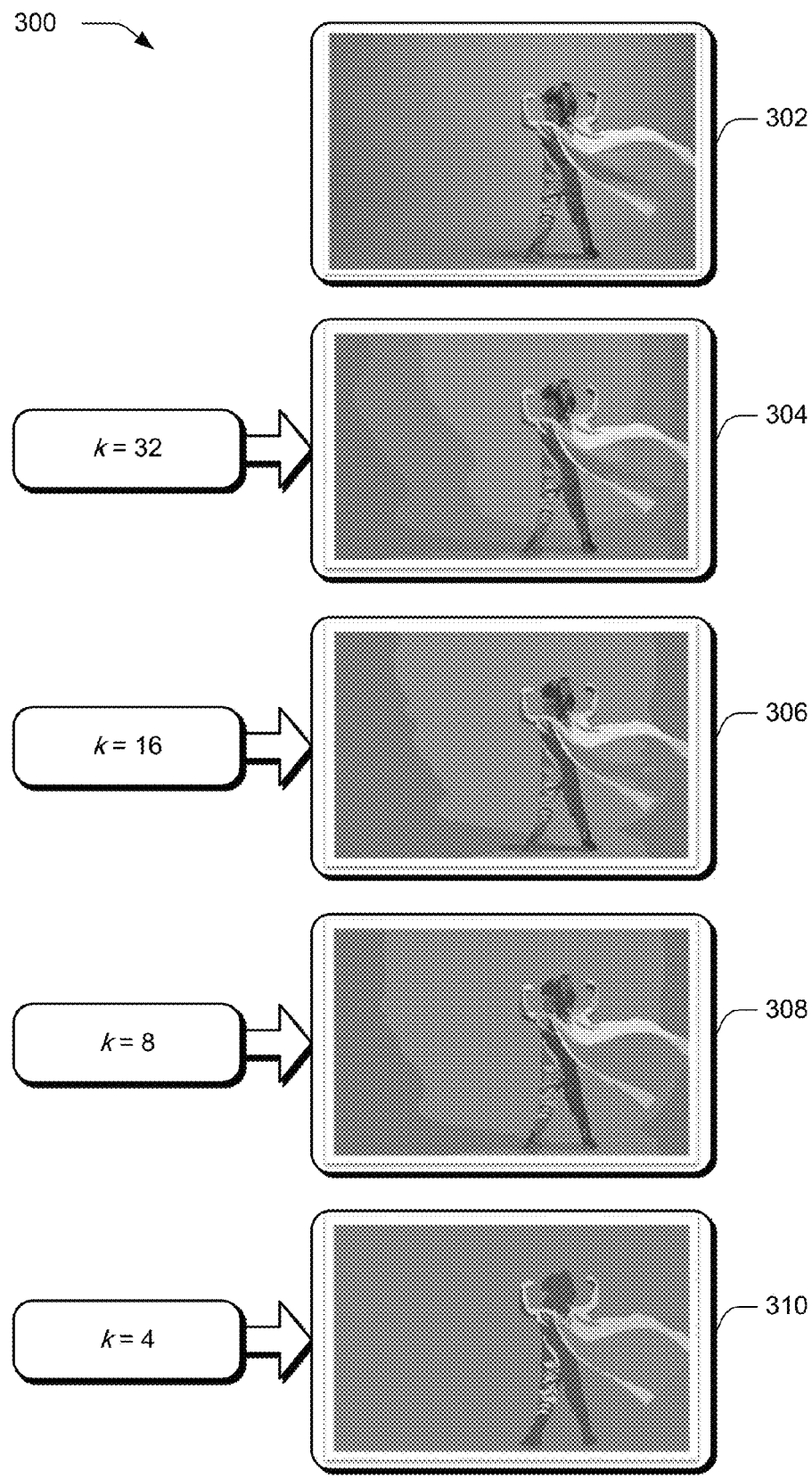
FIG. 3 illustrates example color vector previews of an image as generated by the color vector preview system of FIG. 1 in accordance with one or more implementations.

FIG. 3 depicts an example implementation 300 in which an image frame 302 is depicted as a color vector preview using different amounts of colors. For instance, in the illustrated example, image frame 302 depicts a girl with brown hair in a pink outfit wearing a yellow cape against a blue gradient background, where a portion of the background closest to the girl is light blue that gradually deepens in shade as the gradient extends towards a border of the image frame 302.

Vector previews 304, 306, 308, and 310 each represent an instance of a color vector preview 108 of the image frame 302, as generated by the color vector preview system 104 using the techniques described herein. Vector preview 304 is illustrated as including 32 different colors, while vector preview 306 includes 16 different colors, vector preview 308 includes eight different colors, and vector preview 310 includes four different colors. As evidenced by the illustrated example, a number of colors included in the vector preview directly correlates to an amount of detail from the image frame preserved in the vector preview. For instance, the vector preview 304's inclusion of 32 colors results in a depiction of the gradient background of image frame 302 as having a banding effect, where the blue gradient background is instead represented as different bands of varying shades of blue.

By reducing a number of included colors from 32 to 16, the vector preview 306 reduces the banding effect present in vector preview 304, but reduces a level of detail otherwise depicted in the image frame 302. For instance, reducing the included colors from the 32 included in vector preview 304 to the 16 included in vector preview 306 lessens a texture detail of the depicted girl's clothing and cape, such as wrinkles, shadows, and the like. While reducing the number of colors from 32 or 16 to the eight different colors included in vector preview 308 further mitigates the banding effect otherwise present in vector previews 304 and 306, the loss of detail associated with such a reduction color is further emphasized by vector preview 308, where image data defining the girl subject of the image frame 302 is lost (e.g., color of hands, discrepancy between outfit and skin tones, texture defining the girl's clothing and cape, and so forth).

The correlation between detail preservation and a number of colors included in a color vector preview of an image frame is further emphasized by vector preview 310's inclusion of only four different colors, where the background banding effect of vector previews 304, 306, and 308 is eliminated, at the tradeoff cost of sacrificing most of the details depicting the girl (e.g., boundaries between hair, skin, outfit, and cape are virtually indistinguishable). Thus, a number of colors to be included in a color vector preview of an image frame is an important consideration that directly affects a resulting visual quality of a color vector representation of the image frame.

Returning to FIG. 2, upon receipt of the filtered pixel values 208, the color palette module 114 is configured to determine a color palette 210 for use in generating the color vector preview 108 of the image frame 204. To do so, the color palette module 114 determines an integer k that limits an amount of colors to be included in the color palette 210. In some implementations, an initial value of the integer k is predetermined by the color vector preview system 104. Alternatively or additionally, the value of k is specified via input provided to a user interface for the color vector preview system 104, as described in further detail below with respect to FIG. 4. Alternatively or additionally, the color palette module 114 automatically, without user intervention, determines the value of k by initially selecting a large number of colors to be included in the color palette 210, and automatically eliminating colors based on a number of pixels that are assigned to a color and the color space distance(s) between colors in the color palette.

Because the color smoothing operations performed by the smoothing module 110 and the subsequent noise filtering operations performed by the noise removal module 112 result in a simplified output of the image frame 204 in terms of color details (e.g., as represented by the filtered pixel values 208), the color palette module 114 is configured to determine the color palette 210 on a scaled-down version of the image frame 204's texture. By processing only the scaled-down version of the image frame 204's texture, an amount of computational resources and processing time otherwise required to determine the color palette 210 is reduced, thus improving an overall performance of the pipeline of operations collectively performed by the smoothing module 110, the noise removal module 112, and the color palette module 114.

Given the integer k, the color palette module 114 selects k different colors from the filtered pixel values 208. In selecting the k different colors from the filtered pixel values 208, the color palette module 114 is configured to ensure maximum possible separation between individual color values associated with each of the k different colors. To do so, the color palette module 114 iteratively selects the k different colors by comparing a newly picked color with one or more already picked colors. The selected k different colors are then used by the color palette module 114 to initialize a clustering algorithm, such as a k-means algorithm, to calculate final color clusters for use in generating the color vector preview 108. In some implementations, the color palette module 114 is configured to run multiple passes (e.g., five) of the k-means clustering algorithm in determining k color clusters, the centroids of which become the color palette 210.

The color palette 210 is then communicated from the color palette module 114 to the recoloring module 116 for use in recoloring the filtered pixel values 208 using the color palette 210 to generate the color vector preview 108. Upon receipt of the color palette 210, the recoloring module 116 is configured to obtain the filtered pixel values 208 for the image frame 204 and compare each pixel in the filtered pixel values 208 with color values of the no more than k colors included in the color palette 210. Each pixel in the filtered pixel values 208 is then recolored using the closest color value in the color palette 210, based on the comparison, and the recolored filtered pixel values 208 are output as the color vector preview 108.

Because the clustering algorithm implemented by the color palette module 114 is a computationally intensive and relatively slow process, the color palette module 114 is unable to determine a color palette 210 for each image frame 204 of the image data 202 when the image data 202 is representative of a live video camera feed. For instance, in an example scenario where the image data 202 represents a video and each image frame 204 corresponds to a frame of the video, the color vector preview system 104 might receive multiple video frames (e.g., three video frames) in the time required to determine the color palette 210 for a first one of the three video frames. Thus, in such a scenario where the image data 202 represents a video captured by a computing device implementing the color vector preview system 104, while each image frame 204 is passed through the smoothing module 110, the noise removal module 112, and the recoloring module 116 for use in generating a corresponding color vector preview 108, not every image frame 204 is communicated to the color palette module 114 for use in determining a color palette 210.

Rather, to ensure that a color vector preview 108 is generated in real-time for each frame of a video, the color vector preview system 104 waits until the color palette module 114 has finished determining color palette 210 for an initial image frame 204 before providing filtered pixel values 208 representing a subsequent image frame 204 to the color palette module 114, as indicated by the dashed arrow connecting the filtered pixel values 208 to the color palette module 114. To maintain the real-time output of color vector previews 108 for image frames 204 of a video, the recoloring module 116 is configured to leverage a most recently extracted color palette 210 in recoloring filtered pixel values 208 representing each of the image frames 204 for the video. Thus, continuing the example scenario where the image data 202 corresponds to a video and image frames 204 each correspond to an individual video frame of the video, some image frames 204 are not processed by the color palette module 114.

Due to similar image compositions between adjacent video frames, a color palette 210 determined from a previous video frame can be used to generate a color vector preview 108 for a subsequent video frame while maintaining a visual fidelity of the captured physical environment 106. Based on the similar image compositions between adjacent video frames, the color palette module 114 is configured to use colors of the color palette 210 as the basis for initializing the clustering algorithm used for determining a color palette 210 for filtered pixel values 208 representing a subsequent image frame 204, thereby improving a speed at which the color palette module 114 determines a color palette 210 for a subsequently processed image frame 204.

The recoloring module 116 is configured to maintain and use the color palette 210 for use in generating a color vector preview 108 for each image frame 204, until a new color palette 210 is received from the color palette module 114. This process continues with the recoloring module 116 using a most up-to-date color palette 210 to generate color vector previews 108 for each of the image frames 204 until all frames of the image data 202 have been processed. Color vector previews 108 achieving a desired visual appearance can then be communicated to the vector generation system 118, together with the color palette 210 used to generated the color vector preview(s) 108, for use in generating a color vector representation 212 of the corresponding image frame(s) 204.

The vector generation system 118 is configured to utilize a known vectorization library and create salient vectors from the color vector preview 108. For instance, the vector generation system 118 utilizes a vector library configured to convert raster (e.g., bitmap) image data, such as the color vector preview 108, into a vector representation. Because the color vector preview 108 passed to the vector generation system 118 includes uniform color regions with a limited number of colors constrained by the color palette 210, the vector generation system 118 is configured to generate the color vector representation 212 with minimal vector smoothing iterations, which improves an overall processing time required by the vector generation system 118 to generate the color vector representation 212. As visually depicted by the approximately equals symbol, a resulting appearance of the color vector representation 212 is visually similar to that of the color vector preview 108. The color vector representation 212 can then be output by the vector generation system 118 to a display device of the computing device implementing the color vector preview system 104, such as a display of computing device 102.

Figure 4:
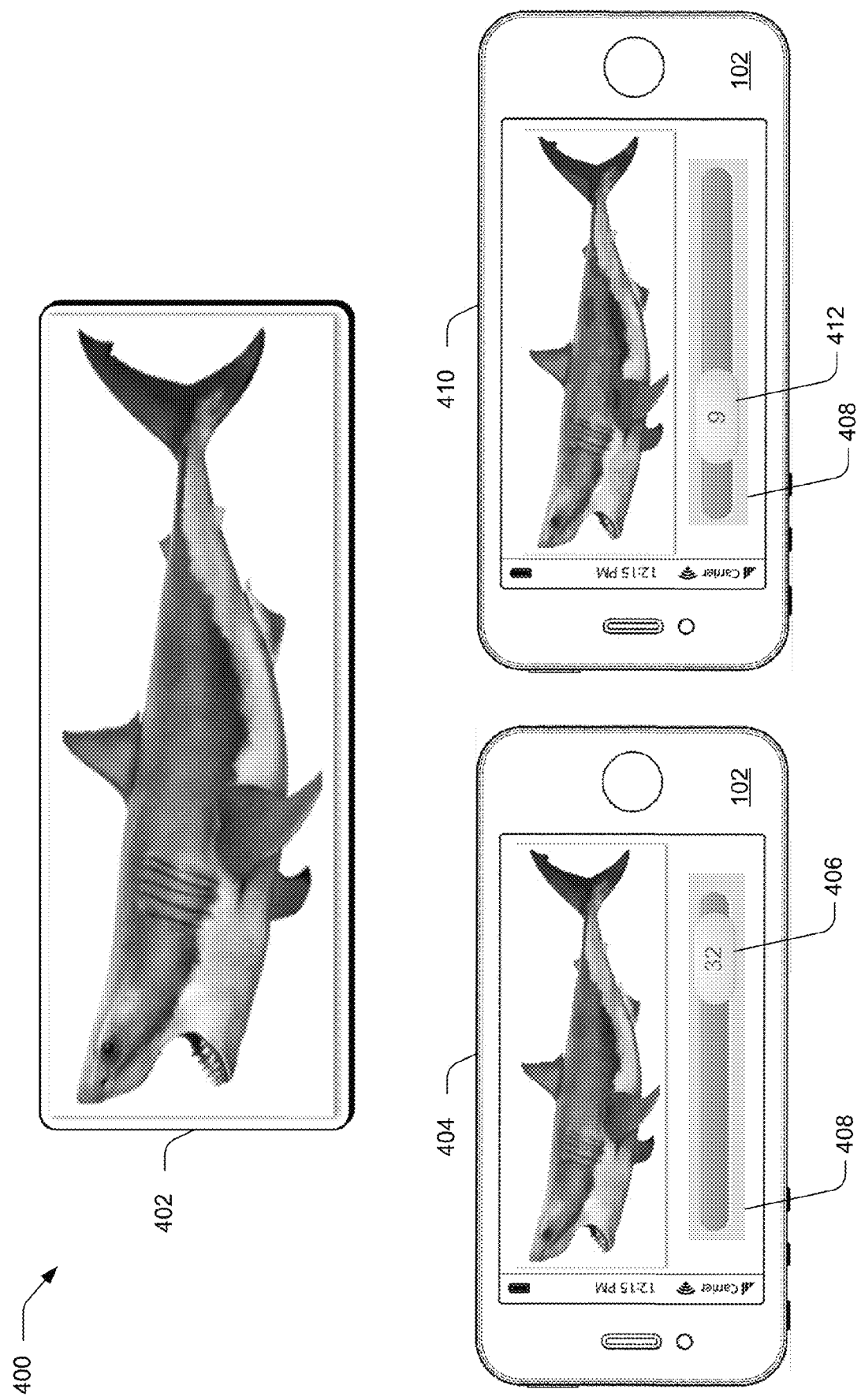
FIG. 4 illustrates an example user interface for the color vector preview system of FIG. 1 that enables adjustment of a number of colors included in a color vector preview of an image in accordance with one or more implementations.

FIG. 4 depicts an example implementation 400 in which a color vector preview 108 of an image frame captured by a computing device is output in real-time at a display of the computing device. For instance, in the illustrated example, image frame 402 is representative of an image frame 204 obtained by an image capture device of a computing device implementing the color vector preview system 104, such as computing device 102 of FIG. 1.

In the example implementation 400, example 404 depicts the computing device 102 as outputting a color vector preview 108 of the image frame 402, where 32 different colors were used to generate the color vector preview. The inclusion of 32 different colors is specified by a slider 406 of control 408, where control 408 is presented as part of a user interface for the color vector preview system 104. The control 408 is selectable via user input to modify a position of the slider 406, and consequently modify a number of colors to be included in the color vector preview 108 of image frame 402, in real-time. For instance, example 410 depicts an instance where the computing device 102 outputs a color vector preview 108 of the image frame 402 as including only nine different colors, as specified by the slider 412 of the control 408, rather than the 32 colors included in example 404.

Thus, the color vector preview system 104 is configured to output a control in a user interface that includes the color vector preview 108, where the control is selectable to modify a k value used by the color palette module 114 to generate a color palette 210. Although described and illustrated in the context of a slider control 406, the control presented by the color vector preview system 104 can be configured in any suitable manner that enables a user to specify a number of colors to be included in a color vector preview 108, such as a drop-down menu, a prompt configured to receive numerical and/or textual input, a scroll wheel, selectable icons (e.g., arrows, buttons, etc.), combinations thereof, and so forth. In this manner, the color vector preview system 104 enables a user to visually identify in real-time how an image of a physical environment 106 will appear when rendered as a vector representation 212 including no more than a specified number of colors. The color vector preview system 104 thus advantageously enables a user to modify the number of colors included in the color vector preview 108 and/or environmental conditions (e.g., lighting, background, etc.) that affect a resulting appearance of the color vector preview 108, without the time delay otherwise required by conventional vectorization systems to generate a color vector representation.

Having considered example details of the techniques involved in generating a color vector representation of a physical environment, consider now some example procedures to illustrate additional aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

Figure 5:
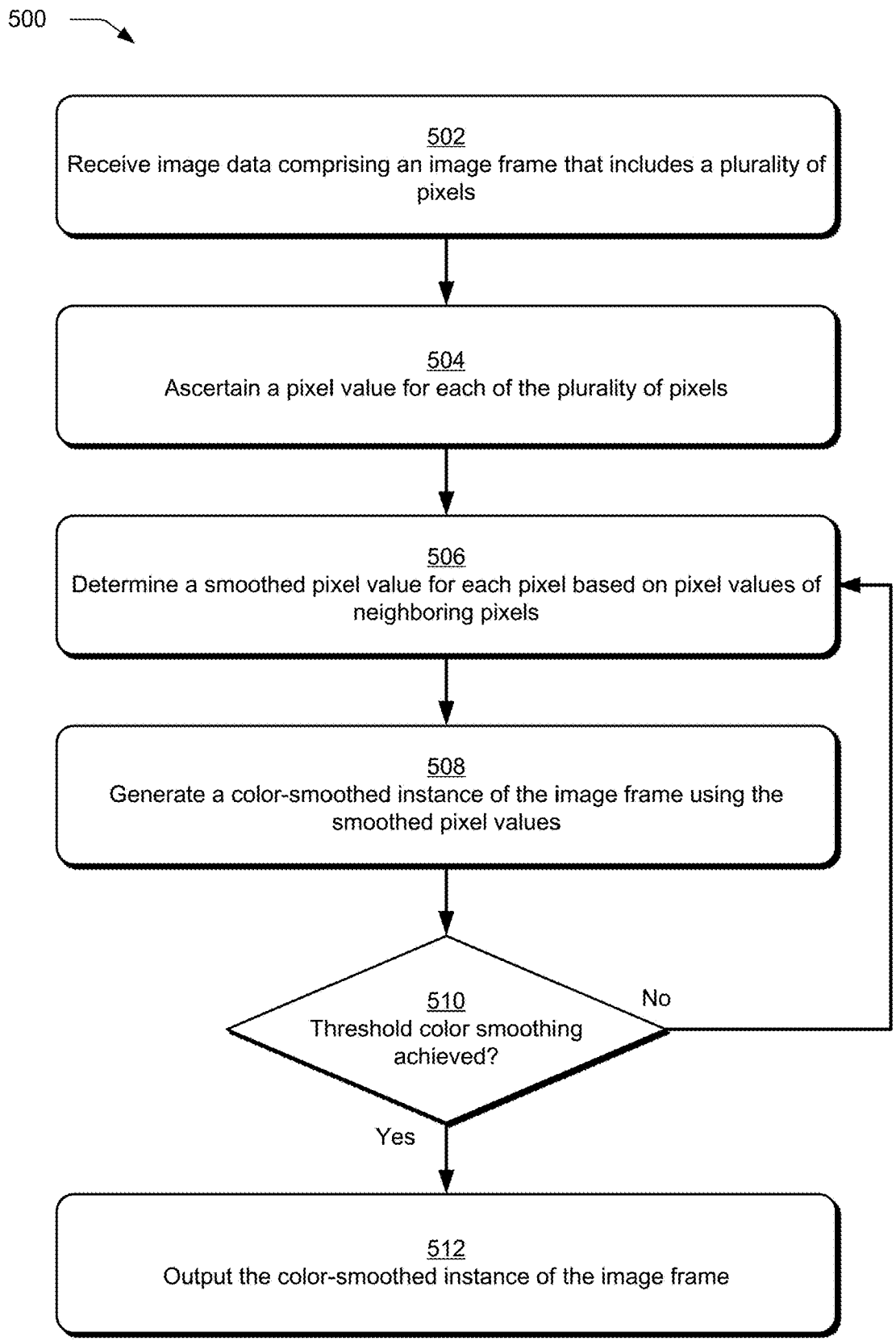
FIG. 5 is a flow diagram depicting a procedure in an example implementation for iteratively generating a color-smoothed image frame for use in generating a color vector preview of an image using the techniques described herein.

FIG. 5 depicts a procedure 500 in an example implementation of generating a color-smoothed instance of an image frame to be used as a basis for generating a color vector preview of the image frame. Image data comprising at least one image frame that includes a plurality of pixels is received (block 502). The color vector preview system 104, for instance, receives image data 202 from an image capture device of a computing device implementing the color vector preview system, such as from a camera of computing device 102. Image data 202 is received in the form of a video, where individual frames of the video are communicated to the color vector preview system 104 in the form of individual image frames 204. Each image frame 204 includes a plurality of pixels arranged in a two dimensional grid, where a number of pixels included in each image frame 204 is dependent on a resolution of the image capture device from which the image data 202 was received.

A pixel value is ascertained for each of the plurality of pixels included in the image frame (block 504). The smoothing module 110 of the color vector preview system 104, for instance, analyzes the image frame to determine a pixel value that defines a visual appearance of the pixel. In some implementations, a pixel value is described in terms of intensity values for three or four color components, such as intensity values for red, green, and blue color components or intensity values for cyan, magenta, yellow, and black color components.

Under such implementations, a pixel value for each pixel of the image frame 204 is distilled to a mathematical vector of multiple values, where each value in the mathematical vector represents an intensity for the corresponding color component (e.g., red, green, or blue color component). Alternatively or additionally, in an example scenario where the image frame 204 is a grayscale image depicting various shades of gray, the pixel value may be represented as an integer within a range of possible values from zero to 255, where zero indicates black and 255 indicates white. As such, the pixel value for each pixel is representable in any suitable manner without departing from the scope of the techniques described herein.

A smoothed value for each pixel is then determined based on pixel values of neighboring pixels (block 506). The smoothing module 110, for instance, determines a size of a spatial neighborhood to be considered in generating a color-smoothed instance of the image frame, such as a 5-pixel radius. For each pixel in the image frame 204, the smoothing module 110 assigns mathematical weights to other pixels within the spatial neighborhood relative to the pixel under consideration.

The mathematical weights assigned to individual pixels within the spatial neighborhood relative to the pixel under consideration are determined based on one or more of a spatial proximity of the pixel relative to the pixel under consideration or a similarity in color values between the pixel and the pixel under consideration. In this manner, pixels of the spatial neighborhood that are closer in spatial proximity and color similarity are assigned greater mathematical weights than those of the spatial neighborhood that are more distant to the pixel under consideration, in terms of both spatial and color proximities.

Based on the pixel values and mathematical weights assigned to pixels within a spatial neighborhood relative to the pixel under consideration, the smoothing module 110 determines a smoothed pixel value 206 for the pixel under consideration. Determination of the mathematical weights assigned to pixels within the spatial neighborhood is performed by the smoothing module 110 according to Equation 1, and determination of the smoothed pixel value 206 for the pixel under consideration is performed according to Equation 2. This process of determining a smoothed pixel value 206 is repeated for each pixel of the image frame 204 until smoothed pixel values 206 are determined for an entirety of the image frame 204.

A color-smoothed instance of the image frame is then generated using the smoothed pixel values (block 508). The smoothing module 110, for instance, replaces each of the plurality of pixels in the image frame 204 with a corresponding one of the smoothed pixel values 206. A determination is made as to whether the color-smoothed instance of the image frame achieves a threshold level of color smoothing (block 510). In some implementations, the threshold level of color smoothing is defined in terms of a number of color-smoothing iterations performed by the smoothing module 110 (e.g., five color smoothing iterations). In implementations, the threshold number of color-smoothing iterations is pre-specified by the color vector preview system 104, specified by a user of the color vector preview system 104, or combinations thereof.

In response to determining that a threshold level of color smoothing has not been achieved, the image frame 204 as represented by the smoothed pixel values 206 is returned to the smoothing module 110 for additional color smoothing, as indicated by the arrow returning from block 510 to block 506. Operations of blocks 506, 508, and 510 then continues until a determination is made that a threshold amount of color smoothing is achieved in the smoothed pixel values 206, at which point a color-smoothed instance of the image frame is output (block 512).

For instance, upon determining that the smoothed pixel values 206 achieve a threshold level of color smoothing, the smoothing module 110 communicates the smoothed pixel values 206 to the noise removal module 112. The noise removal module 112 is configured to further process the smoothed pixel values 206 using a single pass median filter and output filtered pixel values 208, which collectively represent a color-smoothed instance of the image frame 204. The color-smoothed instance of the image frame 204 is subsequently used by the color palette module 114 to determine a color palette 210 for use in generating the color vector preview 108 of the image frame 204, as described in further detail below with respect to FIGS. 7 and 8.

Figure 6:
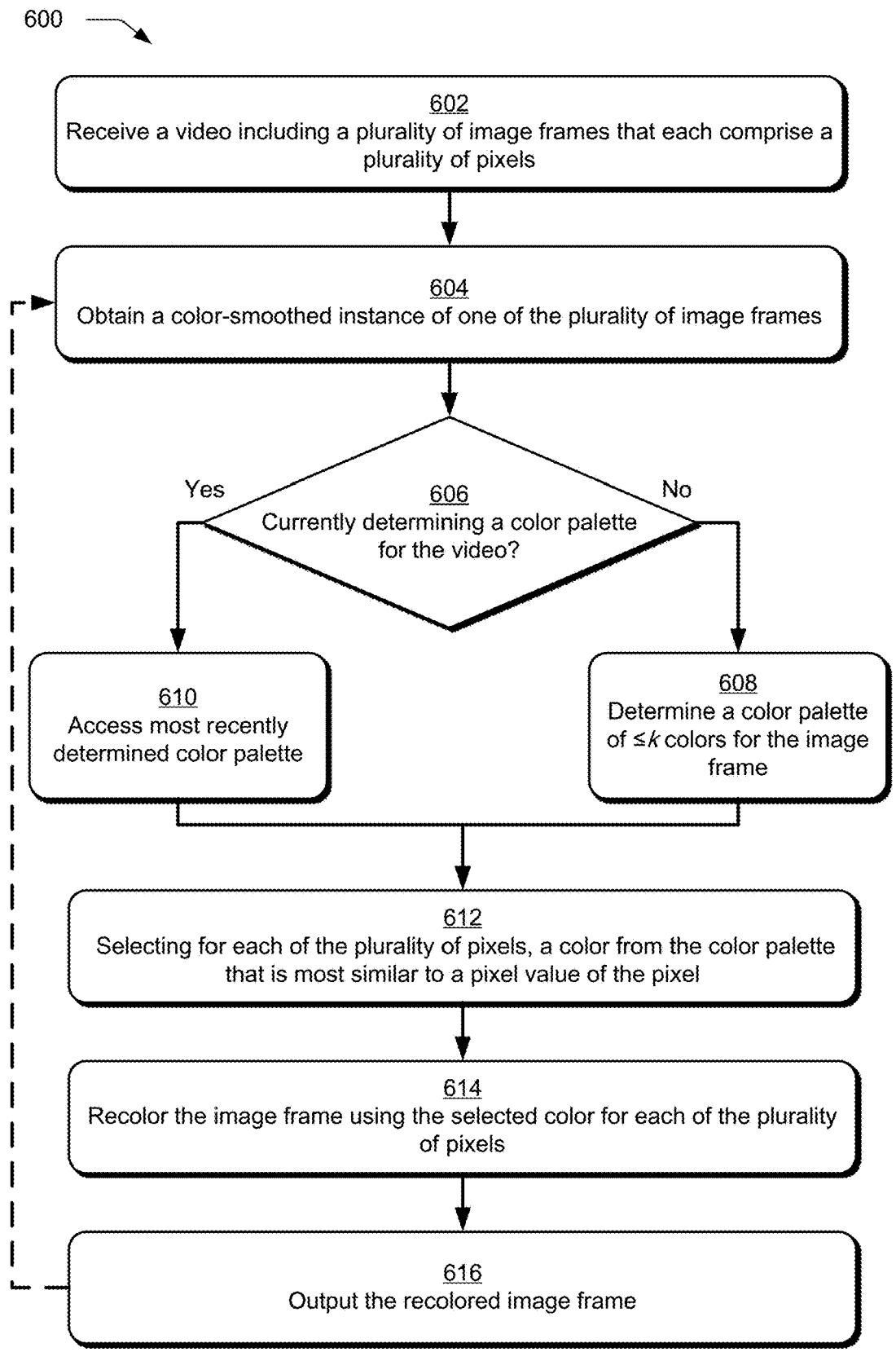
FIG. 6 is a flow diagram depicting a procedure in an example implementation for recoloring image frames of a video in real time to output a color vector preview of the video using the techniques described herein.

FIG. 6 depicts a procedure 600 in an example implementation of determining a color palette of no more than k colors for an image frame and recoloring the image frame using the color palette in accordance with the techniques described herein. A video including a plurality of image frames that each comprise a plurality of pixels is received (block 602). The color vector preview system 104, for instance, receives image data 202 from an image capture device of a computing device implementing the color vector preview system, such as from a camera of computing device 102. Image data 202 is received in the form of a video, where individual frames of the video are communicated to the color vector preview system 104 in the form of individual image frames 204. Each image frame 204 includes a plurality of pixels arranged in a two dimensional grid, where a number of pixels included in each image frame 204 is dependent on a resolution of the image capture device from which the image data 202 was received.

A color-smoothed instance of one of the plurality of image frames is then obtained (block 604). The color-smoothed instance of the image frame may be obtained by processing the image frame according to the operations described in blocks 504, 506, 508, 510, and 512, as described above with respect to FIG. 5. Accordingly, the color palette module 114 obtains the color-smoothed instance of an image frame 204 in the form of filtered pixel values 208.

A determination is then made as to whether a color palette is currently being determined for the video (block 606). The color vector preview system 104, for instance, determines whether the color palette module 114 is actively determining a color palette 210 for an image frame 204 included in the image data 202 for the video. In response to determining that the color palette module 114 is not actively determining a color palette 210 for the image data 202, a color palette of no more than k colors is determined (block 608). The color vector preview system 104 is configured to determine that the color palette module 114 is not currently determining a color palette for the image data 202 of the video based on various considerations, such as in response to determining that the image frame 204 currently being processed is an initial frame of the video or in response to determining that the color palette module 114 has completed processing a previous image frame of the video and generated a color palette 210 for the previous image frame.

To determine a color palette of no more than k colors for the image frame, the color palette module 114 receives an indication of an integer value for k. In some implementations, the integer value for k is pre-specified by the color vector preview system 104. Alternatively or additionally, the integer value for k is specified via user input to one or more controls included in a user interface for the color vector preview system 104, such as at control 408 in the illustrated example of FIG. 4. Given the integer value k, the color palette module 114 selects k different colors from the filtered pixel values 208, while ensuring a maximum possible difference between different ones of the selected colors. To do so, the color palette module 114 iteratively selects the k different colors by comparing a newly picked color with already picked colors.

The selected k different colors are then used by the color palette module 114 to initialize a k-means clustering algorithm. Alternatively, in implementations where the color palette module 114 has previously generated at least one color palette 210 for the image data 202, the color palette module 114 initializes the k-means clustering algorithm using colors from a most recently generated color palette 210. After initializing the k-means clustering algorithm, the color palette module 114 runs multiple passes (e.g., five passes) of the k-means clustering algorithm to determine color clusters. The centroids of the k clusters output by the k-means clustering algorithm are then selected by the color palette module 114 and incorporated into the color palette 210 for the image frame 204, and process 600 proceeds to block 612.

Alternatively, if a determination is made at block 606 that the color palette module 114 is actively determining a color palette for the video, rather than determining a color palette for the image frame, a most recently determined color palette for the video is accessed (block 610). In this manner, the most recently determined color palette corresponds to a color palette 210 generated by the color palette module 114 for a previous image frame of image data 202 for the video. Such a most recently determined color palette is generated by the color palette module 114 according to the actions described above with respect to block 608.

For each of the plurality of pixels included in the color-smoothed instance of the image frame, a color that is most similar to the pixel's color is selected from the color palette (block 612). The recoloring module 116, for instance, obtains the filtered pixel values 208 and the color palette 210 generated for the image frame 204. The recoloring module 116 analyzes each pixel included in the filtered pixel values 208 and compares the pixel's color value to a corresponding one of the k colors included in the color palette 210. The recoloring module 116 replaces the pixel using the closest color value from the color palette 210, thereby recoloring the color-smoothed instance of the image frame 204 (block 614). By replacing each pixel of the color-smoothed instance of the image frame 204 with one of the color values specified by the color palette 210, the image frame 204 is effectively represented as having generally uniform color regions, preserving detail depicted in the image frame 204 without minor color variances otherwise present in the image frame 204.

The recolored image frame is then output as a color vector preview (block 616). The recoloring module 116, for instance, outputs the color vector preview 108 to a display device of the computing device implementing the color vector preview system 104. Process 600 optionally return to block 604 to obtain a subsequent image frame for the video, as indicated by the dashed arrow returning to block 604 from block 616. In this manner, the color vector preview system 104 continues performance of operations described in blocks 604, 606, 608 or 610, 612, 614, and 616 for each image frame 204 included in image data 202 for the video until all video frames have been processed and output as color vector previews 108.

Figure 7:
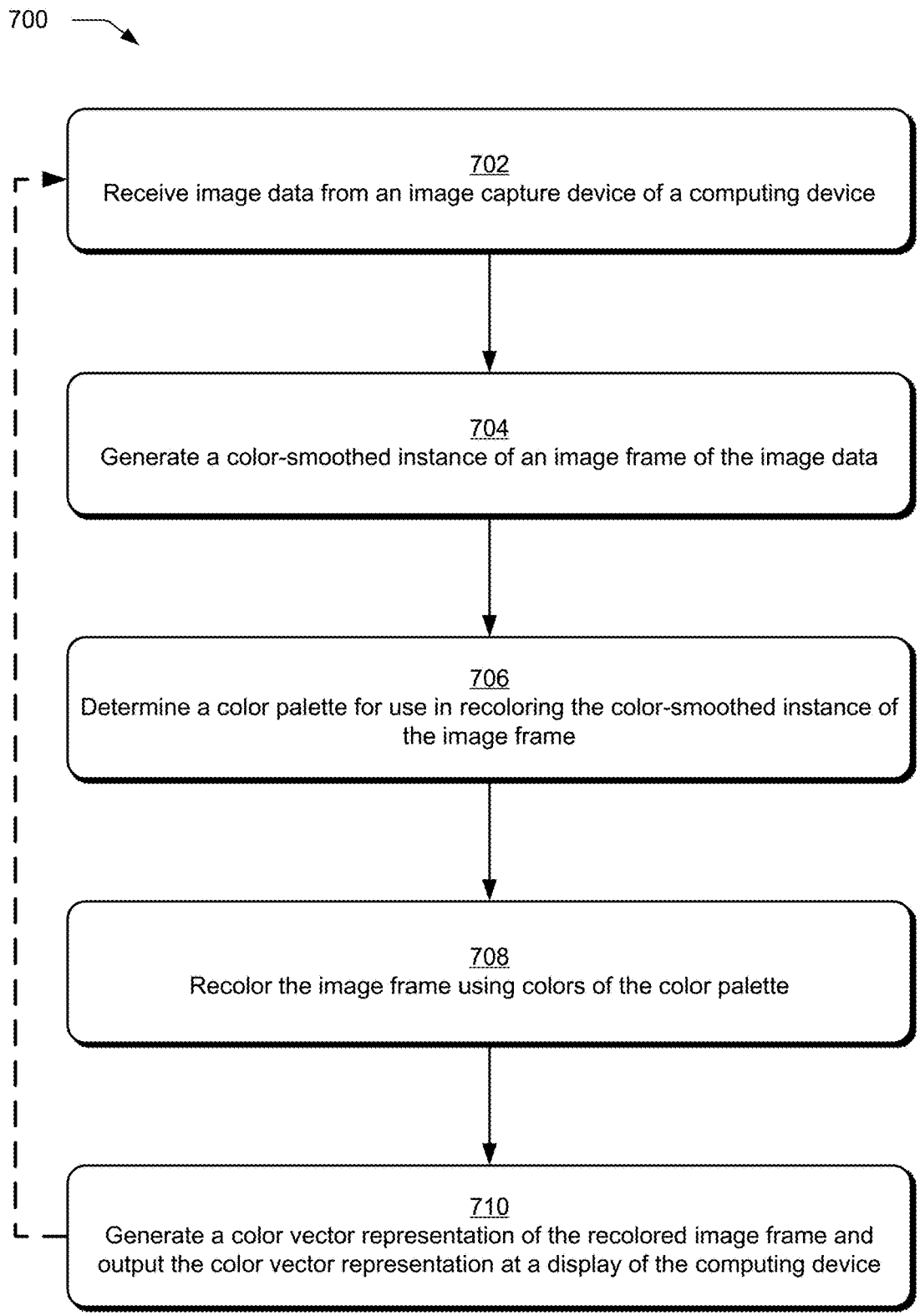
FIG. 7 is a flow diagram depicting a procedure in an example implementation for generating a color vector preview for an image and generating a vector representation based on the color vector preview using the techniques described herein.

FIG. 7 depicts a procedure 700 in an example implementation of outputting a color vector preview for an image frame depicting a physical environment, in real-time at a computing device as the computing device captures the image frame of the physical environment, in accordance with one or more implementations. Image data is received from an image capture device of a computing device (block 702). The color vector preview system 104, for instance, receives image data 202 from an image capture device of a computing device implementing the color vector preview system, such as from a camera of computing device 102. Image data 202 is received in the form of a video, where individual frames of the video are communicated to the color vector preview system 104 in the form of individual image frames 204. Each image frame 204 includes a plurality of pixels arranged in a two dimensional grid, where a number of pixels included in each image frame 204 is dependent on a resolution of the image capture device from which the image data 202 was received.

A color-smoothed instance of an image frame included in the image data is then generated (block 704). In some implementations, the color-smoothed instance of the image frame is generated by processing the image frame according to the operations described in blocks 504, 506, 508, 510, and 512, as described above with respect to FIG. 5. As described with respect to FIG. 5, the smoothing module 110 determines smoothed pixel values 206 for the image frame 204, which are subsequently filtered by the noise removal module 112 to generate filtered pixel values 208. The filtered pixel values 208 output by the noise removal module 112 are thus representative of the color-smoothed instance of the image frame 204 for the image data 202.

A color palette for use in recoloring the color-smoothed instance of the image frame is then determined (block 706). The color vector preview system 104, for instance, determines whether the color palette module 114 is actively determining a color palette 210 based on the filtered pixel values 208 for an image frame 204. In response to determining that the color palette module 114 is not actively determining a color palette 210 for the image data 202, a color palette of no more than k colors is determined by first identifying an integer value for k. In some implementations, the integer value for k is pre-specified by the color vector preview system 104. Alternatively or additionally, the integer value for k may be specified via user input to one or more controls included in a user interface for the color vector preview system 104, such as at control 408 in the illustrated example of FIG. 4. Given the integer value k, the color palette module 114 selects k different colors from the filtered pixel values 208, while ensuring a maximum possible difference between different ones of the selected colors. To do so, the color palette module 114 iteratively selects the k different colors by comparing a newly picked color with already picked colors.

The selected k different colors are then used by the color palette module 114 to initialize a k-means clustering algorithm. Alternatively, in implementations where the color palette module 114 has previously generated at least one color palette 210 for the image data 202, the color palette module 114 initializes the k-means clustering algorithm using colors from a most recently generated color palette 210. After initializing the k-means clustering algorithm, the color palette module 114 runs multiple passes (e.g., five passes) of the k-means clustering algorithm to determine color clusters. The centroids of the k clusters output by the k-means clustering algorithm are then selected by the color palette module 114 and incorporated into the color palette 210 for the image frame 204.

Alternatively, if a determination is made that the color palette module 114 is actively determining a color palette for the video, rather than determining a color palette for the image frame, a most recently determined color palette for the video is selected. In this manner, the most recently determined color palette corresponds to a color palette 210 generated by the color palette module 114 for a previous image frame 204 of image data 202.

The image frame is then recolored using colors included in the color palette and outputs the recolored image frame as a color vector preview (block 708). The recoloring module 116, for instance, obtains the filtered pixel values 208 representing image frame 204 and the color palette 210. The recoloring module 116 analyzes each pixel included in the filtered pixel values 208 and compares the pixel's color value to a corresponding one of the k colors included in the color palette 210. The recoloring module 116 replaces each of the filtered pixel values 208 using the closest color value from the color palette 210, and outputs the recolored image frame as a color vector preview 108 for the image frame 204.

Process 700 optionally returns to block 702 to obtain a subsequent image frame (e.g., a subsequent video frame of a video), as indicated by the dashed arrow returning to block 702 from block 708. In this manner, the color vector preview system 104 continues performance of operations described in blocks 702, 704, 706, and 708 for each image frame 204 included in image data 202 until all image frames have been processed and output as color vector previews 108 at the computing device 102.

A color vector representation of the color vector preview is optionally generated and output at a display of the computing device (block 710). The vector generation system 118, for instance, receives the color vector preview 108 and the color palette 210 and utilizes a vectorization library to generate a color vector representation 212 of the image frame 204. For instance, the vector generation system 118 outputs a vector representation 212 of image frame 204 at a display of the computing device 102 that was used to capture the image frame 204.

Having described example procedures in accordance with one or more implementations, consider now an example system and device that can be utilized to implement the various techniques described herein.

Example System and Device

Figure 8:
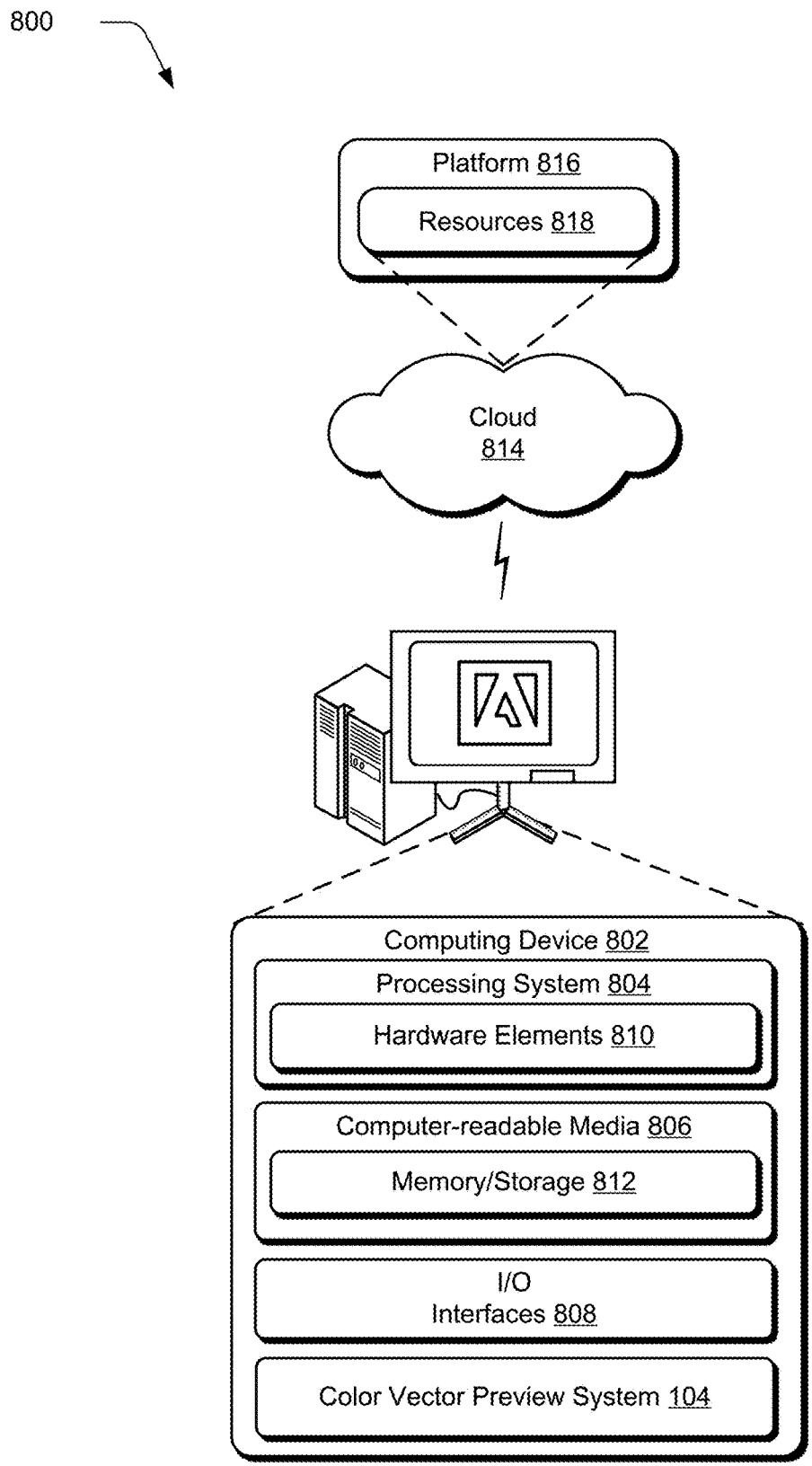
FIG. 8 illustrates an example system including various components of an example device that can be implemented as a computing device as described and/or utilized with reference to FIGS. 1-7 to implement the techniques described herein.

FIG. 8 illustrates an example system generally at 800 that includes an example computing device 802 that is representative of one or more computing systems and/or devices that may implement the various techniques described herein. This is illustrated through inclusion of the color vector preview system 104 and the vector generation system 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for generating a color vector preview of image data, a computer implemented method comprising:
   receiving, by a computing device, image data comprising a plurality of image frames, each of the plurality of image frames including a plurality of pixels;
   receiving, by the computing device, user input specifying a number of different colors included in a first image frame of the plurality of image frames to be used in generating a color vector preview of the plurality of image frames;
   determining, by the computing device, a color palette based on the first image frame, the color palette consisting the number of different colors specified by the user input;
   generating, by the computing device, the color vector preview of the plurality of image frames by recoloring the first image frame and at least one additional image frame of the plurality of image frames using the color palette; and
   outputting, by the computing device, a display of the color vector preview.

2. The method of claim 1, wherein the image data is received from an image capture device of the computing device.

3. The method of claim 1, wherein outputting the display of the color vector preview is performed during the receiving the image data.

4. The method of claim 1, wherein the image data comprises a video and each of the plurality of image frames is a frame of the video, the method comprising performing the generating and the outputting for each frame of the video.

5. The method of claim 1, wherein determining the color palette based on the first image frame comprises generating a color-smoothed instance of the first image frame by assigning a replacement pixel value to each of the plurality of pixels of the first image frame, the replacement pixel value being determined based on pixel values of pixels of the plurality of pixels that fall within a spatial neighborhood of the pixel.

6. The method of claim 5, further comprising generating a vector graphic representation from the color vector preview by creating salient vectors based on the color-smoothed instance of the first image frame.

7. The method of claim 5, wherein the spatial neighborhood comprises a five-pixel radius, the method further comprising computing the replacement pixel value by assigning mathematical weights to pixel values within the spatial neighborhood based on a proximity to the pixel for which the replacement pixel value is computed.

8. The method of claim 5, wherein generating the color-smoothed instance of the first image frame comprises iteratively repeating, for a threshold number of iterations, the assigning the replacement pixel value to each of the plurality of pixels to a result of a prior iteration.

9. The method of claim 5, wherein determining the color palette comprises:
  generating a distribution of color-smoothed pixel values based on the first image frame, the distribution comprising representations of pixel values for each of the plurality of pixels in the color-smoothed instance of the first image frame;
  selecting a number of different pixel values from the distribution of color-smoothed pixel values, the number of different pixel values corresponding to the number of different colors specified by the user input;
  providing the selected number of different pixel values as an initial input to a clustering algorithm; and
  selecting final colors for the color palette by running a threshold number of passes of the clustering algorithm.

10. The method of claim 9, wherein selecting the number of different pixel values from the distribution of color-smoothed pixel values comprises maximizing a difference between individual pixel values of the selected number of different pixel values.

11. In a digital medium environment for generating a color vector preview of image data, a system comprising:
  at least one processor; and
  a computer-readable storage medium having instructions stored thereon that are executable by the at least one processor to perform operations comprising:
    capturing a video using a camera of a computing device;
    displaying a color vector preview of the video at a display of the computing device, the color vector preview depicting an appearance of the video following conversion of the from a raster graphic format to a vector graphic format;
    presenting a control at the display of the computing device that is selectable to specify a number of colors to be included in the color vector preview;
    receiving input to the control; and
    modifying the color vector preview to include a number of colors specified by the input.

12. The system of claim 11, wherein displaying the color vector preview of the video is performed simultaneously with capturing the video.

13. The system of claim 11, the operations further comprising displaying an additional color vector preview of the video at the display of the computing device while displaying the color vector preview, the additional color vector preview comprising a different number of colors than the color vector preview.

14. The system of claim 11, the operations further comprising determining a color palette that includes the number of colors based on an initial frame of the video and periodically updating the color palette based on a subsequent frame of the video, wherein a rate at which the periodically updating is performed is based on a time required to determine the color palette based on the initial frame.

15. The system of claim 14, wherein the subsequent frame of the video is selected responsive to the receiving the input to the control.

16. In a digital medium environment for generating a color vector preview of an image, a method implemented by at least one computing device, the method comprising:
  receiving an image comprising a plurality of pixels;
  determining, for each of the plurality of pixels, a color-smoothed pixel value based on pixel values of pixels within a spatial neighborhood of the pixel;
  computing a filtered pixel value for each of the plurality of pixels based on the color-smoothed pixel values;
  extracting a color palette from the filtered pixel values, the color palette including a number of different colors;
  producing a color vector preview by replacing each of the filtered pixel values using one of the number of different colors included in the color palette; and
  outputting the color vector preview.

17. The method of claim 16, wherein computing the filtered pixel value for each of the plurality of pixels comprises applying a single pass median filter to the color-smoothed pixel values.

18. The method of claim 16, wherein the number of different colors is specified via user input to the at least one computing device.

19. The method of claim 16, the extracting the color palette comprising:
  generating a distribution of the filtered pixel values;
  selecting a number of different pixel values from the distribution of filtered pixel values, the number of different pixel values corresponding to the number of different colors;
  providing the selected number of different pixel values as an initial input to a clustering algorithm; and
  selecting final colors for the vector graphic representation by running a threshold number of passes of the clustering algorithm.

20. The method of claim 16, wherein the image comprises a frame of a video comprising a plurality of frames, the method further comprising performing the receiving, the producing, and the outputting for each of the plurality of frames.

* * * * *